United States Patent Office 3,839,512
Patented Oct. 1, 1974

3,839,512
PROCESS FOR THE PREPARATION OF THIOL-PHOSPHORIC ACID O,S-DIALKYL ESTER AMIDES
Reimer Colln, Wuppertal-Elberfeld, Germany, assignor to Bayer Aktiengesellschaft, Leverkusen, Germany
No Drawing. Filed Jan. 24, 1969, Ser. No. 793,873
Claims priority, application Germany, Feb. 13, 1968,
P 16 68 094.7
Int. Cl. C07f 9/16
U.S. Cl. 260—973                   10 Claims

ABSTRACT OF THE DISCLOSURE

Reacting thiolphosphoric acid-S-alkyl ester dichloride simultaneously with ammonia and alkanol, at a temperature of about −10 to +20° C., optionally in the presence of an inert organic liquid solvent, to form in high yield and purity the corresponding known thiolphosphoric acid O,S-dialkyl ester amides which possess pesticidal, especially systemic insecticidal, properties.

---

The present invention relates to and has for its objects the provision for particular new methods of reacting thiolphosphoric acid-S-alkyl ester dichlorides, i.e. simultaneously with ammonia and alkanol, to form the corresponding thiolphosphoric acid O,S-dialkyl ester amides, which are known pesticides, especially systemic insecticides, e.g. in a simple reaction, using readily available starting materials and resulting in outstanding yields and purity, with other and further objects of the invention becoming apparent from a study of the within specification and accompanying examples.

It is known from German Patent 1,210,835 that thiolphosphoric acid O,S-dialkyl ester amides can be obtained by reacting amido-O-alkyl-thiophosphoric acid salts with methylating agents. This known process, however, exhibits a number of disadvantages. Thus, beginning with the precursor thiophosphoryl chloride, the amido-O-alkyl-thiophosphoric acid salt required as starting material can only be obtained in a 3-step synthesis, the total yield naturally suffering and the effort and expenditure being relatively great.

Furthermore, in the "Journal of the Chemical Society," *1961*, pp. 5532 to 5541, and German Pat. 1,246,730, it is indicated that thiolphosphoric acid O,S-dialkyl ester amides can be obtained by the action of alkylating agents (for example methyl iodide) on thionophosphoric acid O,O-dialkyl ester amides. These latter processes have the disadvantage that the use of very expensive alkylating agents will often be necessary; moreover, the reaction is thermally difficult to control and therefore leads readily to greatly contaminated end products.

It has now been found, in accordance with the present invention, that a versatile and smooth process may be provided for the production in favorably high yields and high purity of a thiolphosphoric acid O,S-dialkyl ester amide of the general formula:

in which R and R' are the same or different lower alkyl radicals, preferably with 1 to 4 carbon atoms, which comprises reacting a thiolphosphoric acid S-alkyl ester dichloride of the formula:

in which R is the same as defined above, simultaneously with ammonia (III) and a lower alkanol of the formula

R'OH          (IV)

in which R' is the same as defined above, at a temperature of substantially between about −10 to +20° C.

A significant feature of the instant process is that it makes possible the preparation of the ester amides of formula (Ia) in good yield and with a high degree of purity.

It is very surprising that, with the present method of working, the desired ester amides can be obtained in high purity and with yields of, for example, over 70% of the theory, since on the basis of the prior art, it would have been expected that the simultaneous action of ammonia and alkanol on a phosphoric acid dichloride would, at best, lead to a difficultly separable mixture of diamide, ester amide and diester. It was therefore not to be foreseen that just the ester amide would result as sole main product of the reaction.

Furthermore, the process of the present invention exhibits many worthwhile advantages. For example, it can be carried out in a simple and danger-free manner. Moreover, the purity and high yield of the end product makes the process simple to perform from the technological aspect. In addition, all of the starting materials are readily accessible technologically and economically.

Where thiolphosphoric acid S-methyl ester dichloride and methanol are taken as examples of starting materials, the course of the reaction can be represented by the following formula scheme:

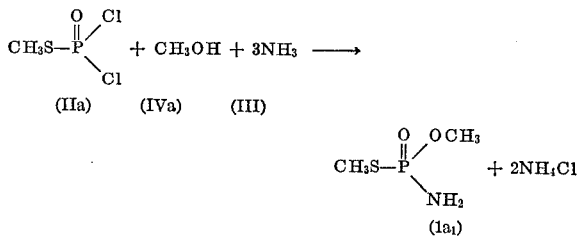

Advantageously, in accordance with the present invention, the starting thiolphosphoric acid S-alkyl ester dichloride and lower alkanol, as well as the corresponding thiolphosphoric acid O,S-dialkyl ester amide which is formed may include as R and R' moieties:

the same or different lower alkyl such as methyl, ethyl, n- and iso-propyl, n-, iso-, sec- and tert.-butyl, and the like, especially $C_{1-4}$ or $C_{1-2}$ alkyl.

The thiolphosphoric acid S-alkyl ester dichlorides of formula (II) above required as starting materials are known from the literature (see for example, "Journal f. prakt. Chemie [4], 1960, Vol. 12, p. 1.).

Of course, ammonia (III) and lower alkanols are readily accessible also.

The process of the present invention is preferably carried out in the presence of a solvent (this term includes a mere diluent). All inert organic solvents or diluents, including mixtures of such solvents and/or diluents, are suitable in which ammonium chloride is insoluble. These include hydrocarbons, especially aromatic, e.g. benzene, hydrocarbons such as benzene, toluene, and the like; preferably chlorinated hydrocarbons, especially chlorinated aliphatic, e.g. lower aliphatic, hydrocarbons, and particularly chlorinated alkanes, e.g. $C_{1-5}$ chlorinated alkanes, for example dichloromethane, dichloroethane, and the like; as well as ethers, especially aliphatic, e.g. di lower alkyl ethers and cycloaliphatic ethers, for example diethyl ether, dioxan, and the like; and also ketones; and nitriles, e.g. lower aliphatic ketones and nitriles, for example, acetonitrile; and the like.

The reaction temperatures can be varied within a fairly wide range. Preferably, the work is carried out at substantially between about −10 to +20° C.

In carrying out the process of the present invention, a greater or lesser molar excess of the alcohol (depending on the nature of the alcohol) may be added, with cooling, to the thiolphosphoric acid S-alkyl ester dichloride dissolved in the solvent, and gaseous ammonia may be introduced into this mixture, with stirring and external cooling, until it is saturated with ammonia. The reaction products may be obtained by removal of the ammonium chloride by means of filtration as well as evaporation of the solvent and of the excess of alcohol; the final products are obtained mostly in crystalline form and high purity.

It will be realized that the ester amides of formula (Ia) which are produced in accordance with the instant process have been found to be very effective insecticides, especially systemic insecticides, and such products are primarily intended for use in this way (cf. Belgian Pat. 666,143).

The invention therefore provides a new process for producing active compounds usable in an insecticidal composition in admixture with a conventional solid diluent or carrier or in admixture with a conventional liquid diluent or carrier containing a surface-active agent of the usual type. The composition may for example contain from 0.1 to 95% by weight of the active compound and be applied to insects and/or their habitat in the well-known manner.

The following examples illustrate, without limitation, the production process of the present invention.

EXAMPLE 1

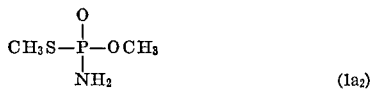
(1a₂)

In a four-necked flask equipped with stirrer, reflux condensor, gas entrance and thermometer there are added to a cooled solution of 82.5 g. thiolphosphoric acid S-methyl ester dichloride (b.p. 78° C./13 mm. Hg) (0.5 mol) in 500 ml. methylene chloride at below 0° C., 24.0 g. methanol (0.75 mol), and gaseous ammonia is then introduced into the mixture, with stirring, an internal temperature of 0° C. being maintained by external cooling. The end of the reaction is manifested by a lessening of the evolution of heat as well as by emergence of ammonia at the end of the reflux. The ammonium chloride formed is then filtered off with suction and the solvent is removed accordingly under reduced pressure. The colorless oil remaining behind (60.5 g.=85.5% of the theory) can be obtained in crystalline form by dissolution in 100 ml. methylene chloride and addition of 150 ml. ligroin at −10° C. After suction filtration and drying, 51.5 g. of colorless crystals of melting point 31 to 33° C. are obtained. The total yield of thiolphosphoric acid O,S-dimethyl ester amide is 73% of the theory. By recrystallization once from ether, the melting point rises to 36° C.

Analysis.—Calculated for molecular weight 141.13: P, 21.95%; S, 22.72%; N, 9.93%. Found: P, 22.35%; S, 22.70%; N, 9.86%.

EXAMPLE 2

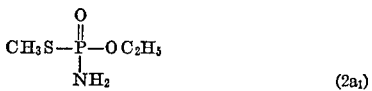
(2a₁)

To a cooled solution of 82.5 g. thiolphosphoric acid S-methyl ester dichloride (0.5 mol) in 400 ml. methylene chloride there are added, at below 0° C., 115 g. ethanol (2.5 mols), and gaseous ammonia is then introduced under the conditions stated in Example 1 until saturation.

The colorless oil (67.7 g.=87.2% of the theory) remaining behind after removal of the ammonium salt and of the solvent solidifies as a crystalline mass during cooling. For purification, it can, before commencement of crystallization, be taken up in 150 ml. ethyl acetate and, after filtration of the solution, be made to crystallize by adding 200 ml. ligroin. There are obtained in this way 55.2 g. of thiolphosphoric acid O-ethyl-S-methyl ester amide as colorless crystals of the melting point 64 to 65.5° C. (Total yield: 71.2% of the theory).

Analysis.—Calculated for molecular weight 155.16: P, 19.97%; S, 20.66%; N, 9.03%. Found: P, 19.80%; S, 20.53%; N, 9.58%.

EXAMPLE 3

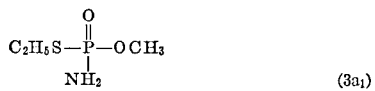
(3a₁)

To a cooled solution of 53.7 g. thiolphosphoric acid S-ethyl ester dichloride (0.3 mol) in 250 ml. methylene chloride there are added, at below 0° C., 15.0 g. methanol. Gaseous ammonia is then introduced into the mixture under the conditions stated in Example 1. After removal of the salt by filtration, and evaporation of the solvent, 39.5 g. of a colorless liquid with the refractive index $n^{23}_D$=1.5074 are obtained.

The yield of thiolphosphoric acid O-methyl-S-ethyl amide is 85% of the theory.

Analysis.—Calculated for molecular weight 155.16: P, 19.97%; S, 20.66%; N, 9.03%. Found: P, 19.28%; S, 20.44%; N, 8.65%.

EXAMPLE 4

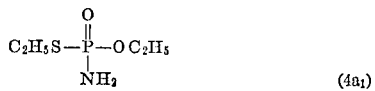
(4a₁)

In a manner analogous with the preceding Examples, from 53.7 g. thiolphosphoric acid S-ethyl ester dichloride and 55.0 g. ethanol, by the action of ammonia, there are obtained, after removal of the salt and of the solvent, 41.5 g. of a colorless oil which crystallizes during standing. The colorless crystalline product possesses the melting point 45° C.

The yield of thiolphosphoric acid O,S-diethyl ester amide is 81.6% of the theory.

Analysis.—Calculated for molecular weight 169.19: P, 18.31%; S, 18.95%; N, 8.28%. Found: P, 18.80%; S, 18.87%; N, 8.79%.

By repeating the foregoing example using thiolphosphoric acid -S-n-propyl, -S-isopropyl, -S-n-butyl, -S-isobutyl. -S-sec.-butyl, -S-tert.-butyl, and the like, ester dichloride with ammonia and methanol, ethanol, n-propanol, iso propanol, n-butanol, isobutanol, sec.-butanol, tert.-butanol, and the like, as the case may be, the corresponding thiolphosphoric acid O-alkyl-S-alkyl ester amides are produced.

It will be appreciated that the instant specification and examples are set forth by way of illustration and not limitation, and that various modifications and changes may be made without departing from the spirit and scope of the present invention.

What is claimed is:

1. Process for the production of thiolphosphoric acid O,S-dialkyl ester amide of the formula

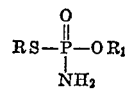

in which R and R', each individually, is lower alkyl, which comprises reacting thiolphosphoric acid S-alkyl ester dichloride of the formula

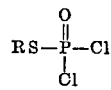

in which R is the same as defined above, simultaneously with ammonia and a lower alkanol of the formula R'OH in which R' is the same as defined above, at a temperature substantially between about −10 and +20° C., to form the corresponding thiolphosphoric acid O,S-dialkyl ester amide.

2. Process according to claim 1 wherein R and R', each individually, has 1–4 carbon atoms.

3. Process according to claim 1 wherein R and R', each individually, has 1–2 carbon atoms.

4. Process according to claim 1 wherein said lower alkanol is used in molar excess with respect to the thiolphosphoric acid S-alkyl ester dichloride present.

5. Process according to claim 1 wherein said ester dichloride is thiolphosphoric acid S-methyl ester dichloride and said alkanol is methanol.

6. Process according to claim 1 wherein said reaction is carried out in the presence of an inert organic liquid solvent.

7. Process according to claim 6 wherein said reaction is carried out in the presence of an inert organic liquid solvent selected from the group consisting of hydrocarbons, chlorinated hydrocarbons, ethers, ketones, nitriles, and mixtures thereof.

8. Process according to claim 6 wherein said solvent is selected from the group consisting of aromatic hydrocarbons, chlorinated aliphatic hydrocarbons, aliphatic and cycloaliphatic ethers, aliphatic ketones, aliphatic nitriles, and mixtures thereof.

9. Process according to claim 6 wherein the formed ester amide is recovered by separating off the resulting ammonium chloride precipitate.

10. Process according to claim 6 wherein the formed ester amide is recovered by separating the resulting reaction mixture from the ammonium chloride precipitate, and distilling off the solvent and any attendant lower alkanol.

References Cited

UNITED STATES PATENTS

| | | | |
|---|---|---|---|
| 2,978,479 | 4/1961 | Kayser et al. | 260—984 X |
| 3,010,986 | 11/1961 | Reetz | 260—984 X |

OTHER REFERENCES

Houben-Weyl, Methoden der Organischen Chemie, Vol. 12/2 (1964), pages 666 and 771.

LORRAINE A. WEINBERGER, Primary Examiner

R. L. RAYMOND, Assistant Examiner

U.S. Cl. X.R.

260—984